(12) United States Patent
Thompson et al.

(10) Patent No.: US 10,040,391 B2
(45) Date of Patent: Aug. 7, 2018

(54) LIGHT BAR FOR RELEASABLY MOUNTING MULTIPLE LIGHT MODULES

(71) Applicant: Electronic Controls Company, Boise, ID (US)

(72) Inventors: Nicholaus M. Thompson, Kuna, ID (US); Tony J. Tewell, Meridian, ID (US); Chris E. Marshall, Boise, ID (US)

(73) Assignee: Electronic Controls Company, Boise, ID (US)

( * ) Notice: Subject to any disclaimer, the term of this patent is extended or adjusted under 35 U.S.C. 154(b) by 0 days.

(21) Appl. No.: 15/566,715

(22) PCT Filed: Nov. 2, 2015

(86) PCT No.: PCT/US2015/058659
§ 371 (c)(1),
(2) Date: Oct. 15, 2017

(87) PCT Pub. No.: WO2017/027051
PCT Pub. Date: Feb. 16, 2017

(65) Prior Publication Data
US 2018/0118097 A1 May 3, 2018

Related U.S. Application Data

(60) Provisional application No. 62/204,368, filed on Aug. 12, 2015.

(51) Int. Cl.
*B60Q 1/26* (2006.01)
*F21S 4/28* (2016.01)
(Continued)

(52) U.S. Cl.
CPC .......... *B60Q 1/2611* (2013.01); *B60Q 1/0041* (2013.01); *B60Q 1/0088* (2013.01);
(Continued)

(58) Field of Classification Search
CPC .. B60Q 1/2611; B60Q 1/0088; B60Q 1/2696; B60Q 1/0041; F21S 4/28; F21S 2/005;
(Continued)

(56) References Cited

U.S. PATENT DOCUMENTS 789,530 A 5/1905 Fenn et al.
D249,250 S 9/1978 Peirish, Jr.
(Continued)

FOREIGN PATENT DOCUMENTS

EP 002092346-0001 8/2012
EP 002092346-0002 8/2012
(Continued)

OTHER PUBLICATIONS

Philips Lightolier, "Comprehensive Lighting Catalog—7th Edition", Track Lighting, Section 2, retrieved on Sep. 21, 2012, 178 pages.

*Primary Examiner* — Thomas M Sember
(74) *Attorney, Agent, or Firm* — Stoel Rives LLP; Robert R. Teel

(57) ABSTRACT

A vehicle-mountable track-lighting light bar (16) supports multiple light modules (5) in user-configurable mounting positions, each of the multiple light modules having a mounting foot (160), electrical contacts (300), and laterally extending track-attachment members (330). Multiple laterally spaced-apart electrically conductive pathways (274) are supported on a floor of each of light module mounting tracks (110, 112, 114). A light module, when its mounting foot is set in a light module mounting track, is slidable lengthwise along the track length while its electrical contacts contact associated ones of the electrically conductive pathways. A controller (276) is electrically associated with the electrically conductive pathways so as to apply electrical signals for delivery to the electrical contacts of the light module.

20 Claims, 13 Drawing Sheets

(51) Int. Cl.

| | | |
|---|---|---|
| *F21S 45/10* | (2018.01) | |
| *B60Q 1/00* | (2006.01) | |
| *F21S 2/00* | (2016.01) | |
| *F21V 23/06* | (2006.01) | |
| *F21V 21/005* | (2006.01) | |
| *F21V 21/15* | (2006.01) | |
| *F21V 21/35* | (2006.01) | |
| *F21V 23/04* | (2006.01) | |
| *F21V 7/06* | (2006.01) | |
| *H05B 33/08* | (2006.01) | |
| *F21Y 115/10* | (2016.01) | |

(52) U.S. Cl.
CPC ............ *B60Q 1/2696* (2013.01); *F21S 2/005* (2013.01); *F21S 4/28* (2016.01); *F21S 45/10* (2018.01); *F21V 7/06* (2013.01); *F21V 21/005* (2013.01); *F21V 21/15* (2013.01); *F21V 21/35* (2013.01); *F21V 23/0407* (2013.01); *F21V 23/06* (2013.01); *H05B 33/0845* (2013.01); *F21Y 2115/10* (2016.08); *H05K 999/99* (2013.01)

(58) Field of Classification Search
CPC ...... F21S 45/10; F21V 23/06; F21V 23/0407; F21V 21/35; F21V 21/005; F21V 21/15; F21V 7/06; H05B 33/0845
See application file for complete search history.

(56) References Cited

U.S. PATENT DOCUMENTS

| | | | |
|---|---|---|---|
| D262,659 S | 1/1982 | Latta et al. | |
| D286,756 S | 11/1986 | Menke et al. | |
| D291,870 S | 9/1987 | Urbanski et al. | |
| D312,424 S | 11/1990 | Foster | |
| D312,425 S | 11/1990 | Foster | |
| D312,978 S | 12/1990 | Foster | |
| 5,091,828 A | 2/1992 | Jincks et al. | |
| D326,621 S | 6/1992 | Jincks et al. | |
| D345,315 S | 3/1994 | Green et al. | |
| D345,316 S | 3/1994 | Green et al. | |
| D359,461 S | 6/1995 | Chen et al. | |
| 5,452,188 A | 9/1995 | Green et al. | |
| D363,675 S | 10/1995 | Sasaki et al. | |
| 5,826,965 A | 10/1998 | Lyons | |
| D402,909 S | 12/1998 | Stanuch | |
| 5,884,997 A | 3/1999 | Stanuch et al. | |
| D410,402 S | 6/1999 | Stein et al. | |
| 6,081,191 A | 6/2000 | Green et al. | |
| D427,537 S | 7/2000 | Green et al. | |
| D432,038 S | 10/2000 | Sasaki et al. | |
| D432,444 S | 10/2000 | Sasaki et al. | |
| 6,140,918 A | 10/2000 | Green et al. | |
| 6,504,487 B1 | 1/2003 | Pederson | |
| D469,711 S | 2/2003 | Neufeglise et al. | |
| D476,253 S | 6/2003 | Stein et al. | |
| 6,722,776 B1 | 4/2004 | Lyons et al. | |
| D499,976 S | 12/2004 | Neufeglise et al. | |
| 6,841,797 B2 | 1/2005 | Isobe et al. | |
| 6,863,424 B2 | 3/2005 | Smith | |
| D518,400 S | 4/2006 | Sasaki et al. | |
| 7,111,957 B2 | 9/2006 | Bernhart et al. | |
| D545,230 S | 6/2007 | Jalala | |
| D556,074 S | 11/2007 | Stein et al. | |
| D578,425 S | 10/2008 | Shin | |
| D585,318 S | 1/2009 | Jalala | |
| 7,484,870 B2 | 2/2009 | Pederson | |
| 7,524,075 B2 | 4/2009 | Mastin | |
| D602,391 S | 10/2009 | Stein | |
| 7,789,530 B2 | 9/2010 | Stein et al. | |
| 7,854,531 B1 | 12/2010 | Lyons | |
| D649,488 S | 11/2011 | Deyaf | |
| 8,147,108 B2 | 4/2012 | Stein et al. | |
| 8,262,250 B2 | 9/2012 | Li et al. | |
| 8,333,311 B2 | 12/2012 | Hubbard | |
| 8,342,725 B2 | 1/2013 | Stein et al. | |
| 9,149,350 B2 | 10/2015 | Ahearn | |
| D742,269 S | 11/2015 | Stein et al. | |
| D742,270 S | 11/2015 | Stein et al. | |
| 9,371,041 B2 | 6/2016 | Almhill et al. | |
| D760,613 S | 7/2016 | George et al. | |
| 9,409,528 B1 | 8/2016 | Datz | |
| 9,428,099 B1 | 8/2016 | Doenges et al. | |
| 9,566,913 B2 | 2/2017 | Sarges et al. | |
| D782,106 S | 3/2017 | Porciatti | |
| 9,592,768 B2 | 3/2017 | Neufeglise | |
| 9,623,795 B2 | 4/2017 | Bowe et al. | |
| 2008/0232129 A1 | 9/2008 | Lyons | |
| 2010/0032117 A1 | 2/2010 | Simonson et al. | |
| 2010/0321177 A1 | 12/2010 | Burke et al. | |
| 2011/0141749 A1 | 6/2011 | Fishman et al. | |
| 2011/0292648 A1 | 12/2011 | Menke, III | |

FOREIGN PATENT DOCUMENTS

| | | |
|---|---|---|
| JP | 2002370576 A | 12/2002 |
| JP | 2008171573 A | 7/2008 |
| JP | 201289285 A | 5/2012 |
| WO | 2014195732 A2 | 12/2014 |

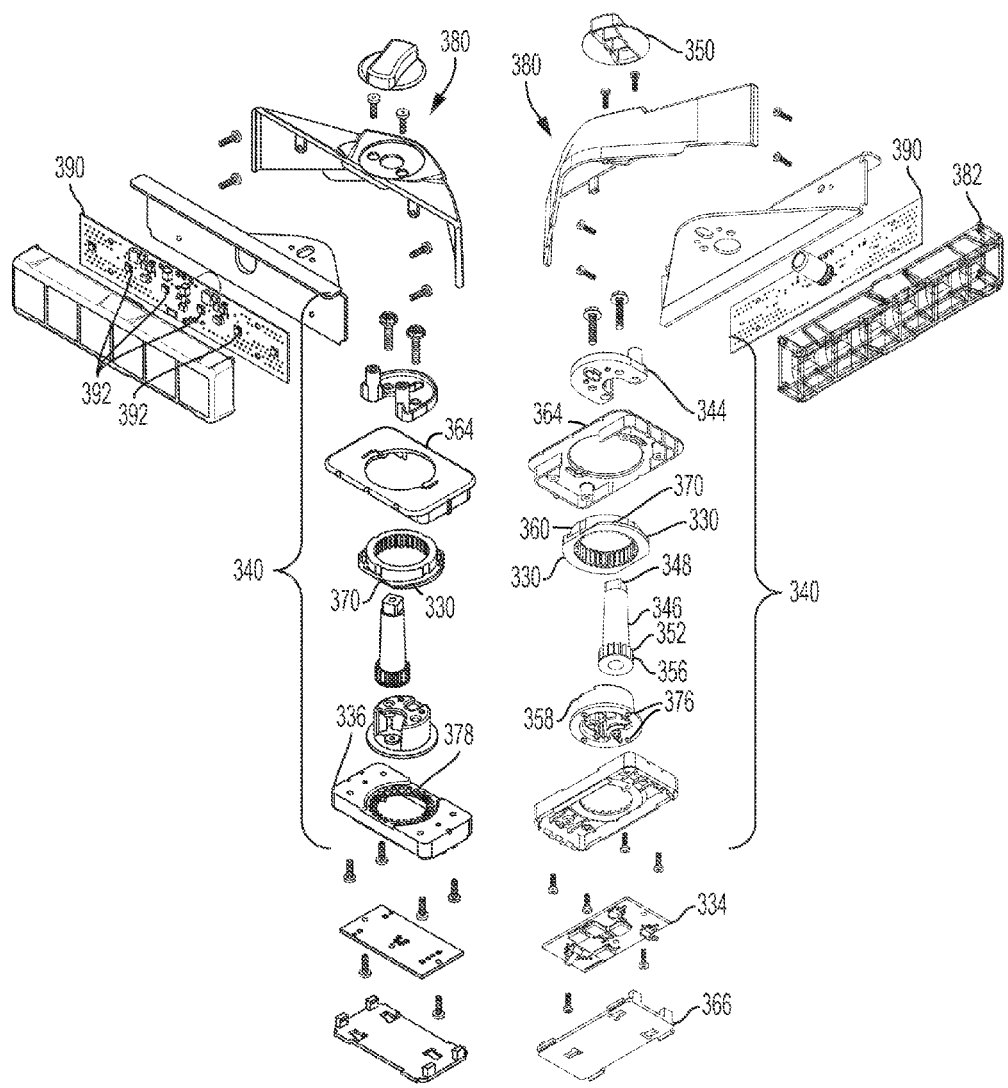

LIGHT BAR FOR RELEASABLY MOUNTING MULTIPLE LIGHT MODULES

RELATED APPLICATIONS

This application is a National Stage of International Application No.—PCT/US2015/058659, filed Nov. 2, 2015, which claims priority benefit of U.S. Provisional Patent Application No. 62/204,368, filed Aug. 12, 2015, which are incorporated herein by reference.

TECHNICAL FIELD

The present disclosure generally relates to vehicle-mountable light bars and, more particularly, to a vehicle-mountable light bar having a chassis for mounting multiple light modules.

BACKGROUND INFORMATION

A light bar secured onto a roof of an emergency or municipal vehicle provides a highly visible platform on which lighting devices are bolted, usually at discrete mounting points, and electrically signaled so as to produce warning light patterns for other vehicles and bystanders. Light bars are also used to carry lights that illuminate areas around the vehicle perimeter to improve lighting conditions for a first responder or other workers.

In operation, light bar lighting devices frequently feature flashing or rotating lighting components known to generate electromagnetic noise that interferes with other electronics and lighting signals. To mitigate the interference noise, previous lighting devices have received electrical power and control signals via dedicated wired connections. The wires, when routed through an internal compartment of a light bar, lessen effects of electromagnetic noise on the operation of sensitive telecommunications equipment inside the vehicle. But as the number of lights in a light bar increases, so does the number of wires routed from lighting equipment to a vehicle's master controller unit and junction box, which may be located in the trunk, in the engine compartment, under a seat within the passenger interior area of the vehicle, or on an interior surface of the roof.

The previous hard-wired, discrete mounting point installation techniques are labor-intensive to install, have bolt patterns and wire connections that do not provide interoperability with lighting devices available from various manufacturers, and do not provide for user-configurable lighting arrangements. For example, replacing a lighting device of a previous light bar entails opening a transparent protective shell by unscrewing or unclipping its fasteners, disconnecting power and signal wires from the lighting device, unfastening the lighting device from the light bar, replacing it with a lighting device having a compatible bolt pattern and wire connectors (often having a proprietary connector type available from a specific vendor), testing the newly installed lighting device, refastening the transparent protective shell, and repeating the process to the extent changes are necessary. Furthermore, due to the use of tools involved during this process, lighting configuration changes typically entail temporarily taking a vehicle out of service.

SUMMARY OF THE DISCLOSURE

A vehicle-mountable track-lighting light bar supports multiple light modules in user-configurable mounting positions, each of the multiple light modules having a mounting foot, electrical contacts, and laterally extending track-attachment members. Multiple laterally spaced-apart electrically conductive pathways are supported on a floor of each of light module mounting tracks. A light module, when its mounting foot is set in a light module mounting track, is slidable lengthwise along the track length while its electrical contacts contact associated ones of the electrically conductive pathways. A controller is electrically associated with the electrically conductive pathways so as to apply electrical signals for delivery to the electrical contacts of the light module.

Additional aspects and advantages will be apparent from the following detailed description of embodiments, which proceeds with reference to the accompanying drawings.

BRIEF DESCRIPTION OF THE DRAWINGS

FIGS. 7 and 8 are respective exploded isometric bottom and top views of a directional light module of FIGS. 1 and 2, showing details of diode bridge electrical circuitry and a planetary gear assembly that collectively facilitate deployment of the track-mounting foot within a mounting track according to different electrical contact positions while providing for rotation of a substantially rectangular optic array toward user-selectable directions.

DETAILED DESCRIPTION OF EMBODIMENTS

Vehicles are typically configured for either left- or right-side driving. This disclosure, therefore, avoids describing light bar features in terms of driver and passenger sides, and instead uses industry standard terms of left (port), right (starboard), head (front), and tail (rear, or back) sides as determined from the perspective of a person sitting in a vehicle and looking through a front windshield.

Figure 1:
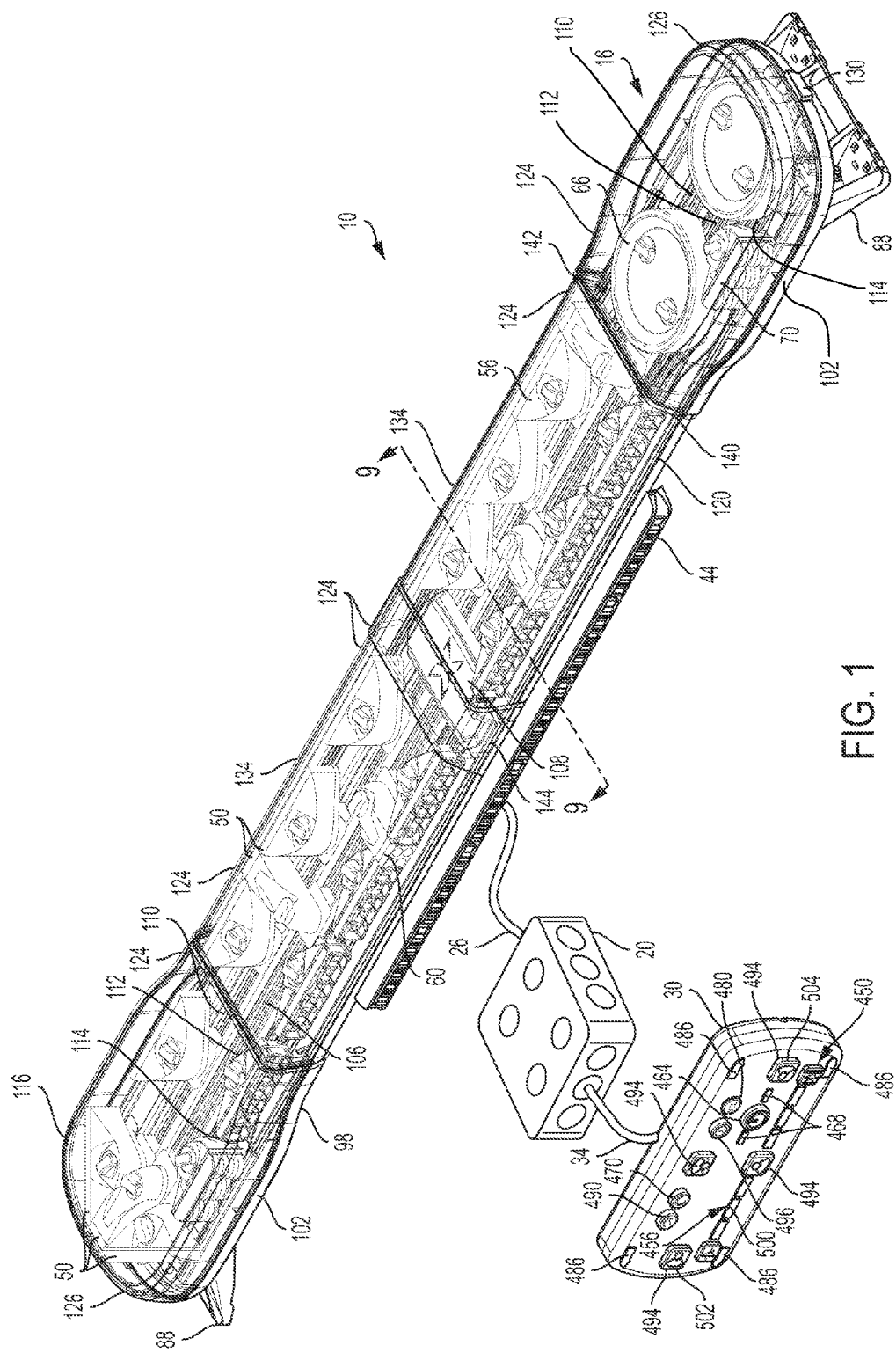
FIG. 1 is an isometric top view of a vehicle track-lighting system including a vehicle-mountable track-lighting light bar, multiple light modules supported on a mounting platform in a user-configurable mounting position, a rearward facing safety director, and a junction box and a keypad user interface configured for placement inside the vehicle passenger compartment.

FIG. 1 shows an overview of a vehicle track-lighting system 10 in an assembled condition, configured for deployment atop a roof of a vehicle (not shown). Vehicle track-lighting system 10 includes a vehicle-mountable track-lighting light bar 16, an electrical connection junction box 20 providing connections to light bar 16 through a first wired connection 26 for conveying electrical power and providing a controller area network (CAN) bus data communication channel, a keypad user interface 30 (shown enlarged) connected to electrical connection junction box 20 through a second wired connection (cable) 34 for conveying electrical power and providing a second CAN bus interface, an external safety director 44, and several light modules 50.

Figure 13:
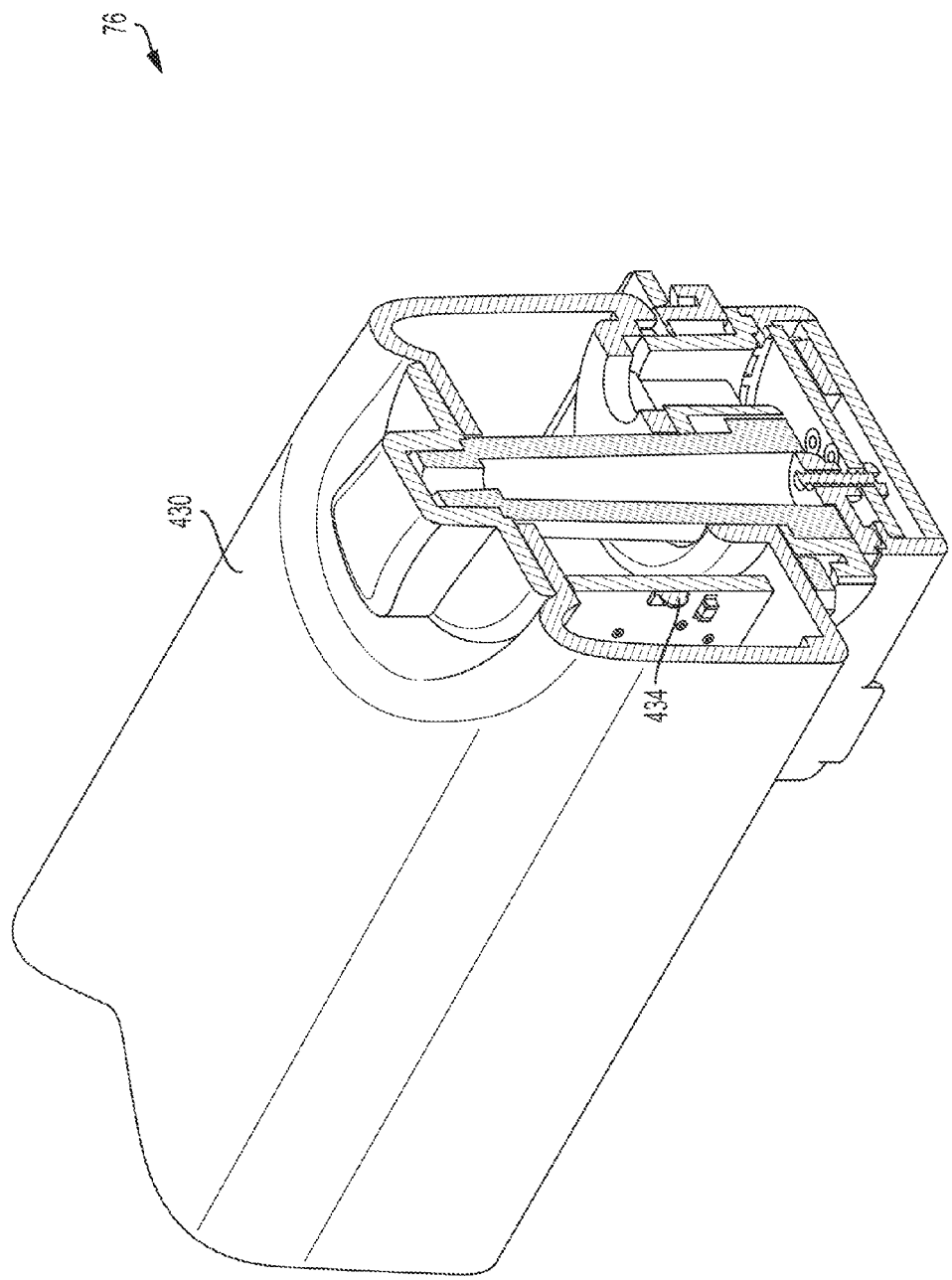
FIG. 13 is a fragmentary isometric cross-sectional view of a left side of a forward illuminated, middle-track light module that has a light dispersing cover and is mountable within a middle mounting track of the light bars of FIGS. 1 and 3.

Light modules 50 include five types of specialized lighting devices, such as, for example, a directional light module 56, a task light module 60, a beacon light module 66, an STI light module 70, and a middle-track light module 76 (FIG. 13). With the exception of STI light module 70, each one of light modules 50 includes a track-mounting foot of a common design such that a track-mounting foot, in cooperation with light bar 16, provides for user-selectable electrical contact positions at releasable mounting locations along mounting tracks of light bar 16. Details of these features are described at length in later paragraphs of this detailed description. Initially, however, the following two paragraphs set forth introductory overviews of, respectively, light bar 16 and four types of light modules being mounted in user-configurable mounting positions along selected mounting tracks.

Light bar 16 has a contoured exterior shape generally defined by the following three light bar components—described in order from bottom to top components. First, a pair of rooftop-mounting feet 88 are spaced apart at lateral ends of light bar 16 to establish a low profile height for reduced aerodynamic drag. Second, a chassis 98 includes plastic U-shaped end caps 102 and an aluminum light-module mounting platform 106 for supporting mounted light modules 50, associated circuitry, and a centrally mounted light bar controller housing 108. Light-module mounting platform 106 has three mounting tracks, including a front mounting track 110 (located closest to a vehicle windshield when light bar 16 is mounted atop the roof), a middle mounting track 112, and a rear mounting track 114 (to be located closest to a vehicle's tail lights). Third, a segment-able protective cover 116, which is also supported by chassis 98 (i.e., in a groove 120 running along a periphery of chassis 98), is transparent for passing light emitted from light modules 50 and includes multiple shaped cover segments 124. End segments 126 of multiple shaped cover segments 124 are each releasable from chassis 98 by rotatably releasing associated latches 130 and lifting end segments 126 out of groove 120 and away from plastic U-shaped end caps 102. Central segments 134, which are narrower in width than rooftop-mounting feet 88 or end segments 126, have free ends 140 encompassed by baffles 142 of end segments 126 (and of a bridge segment 144) when segmentable protective cover 116 is assembled. Baffles 142 also assist in blocking water intrusion. After end segments 126 are separated from free ends 140, however, free ends 140 may also be readily lifted away from groove 120.

Figure 2:
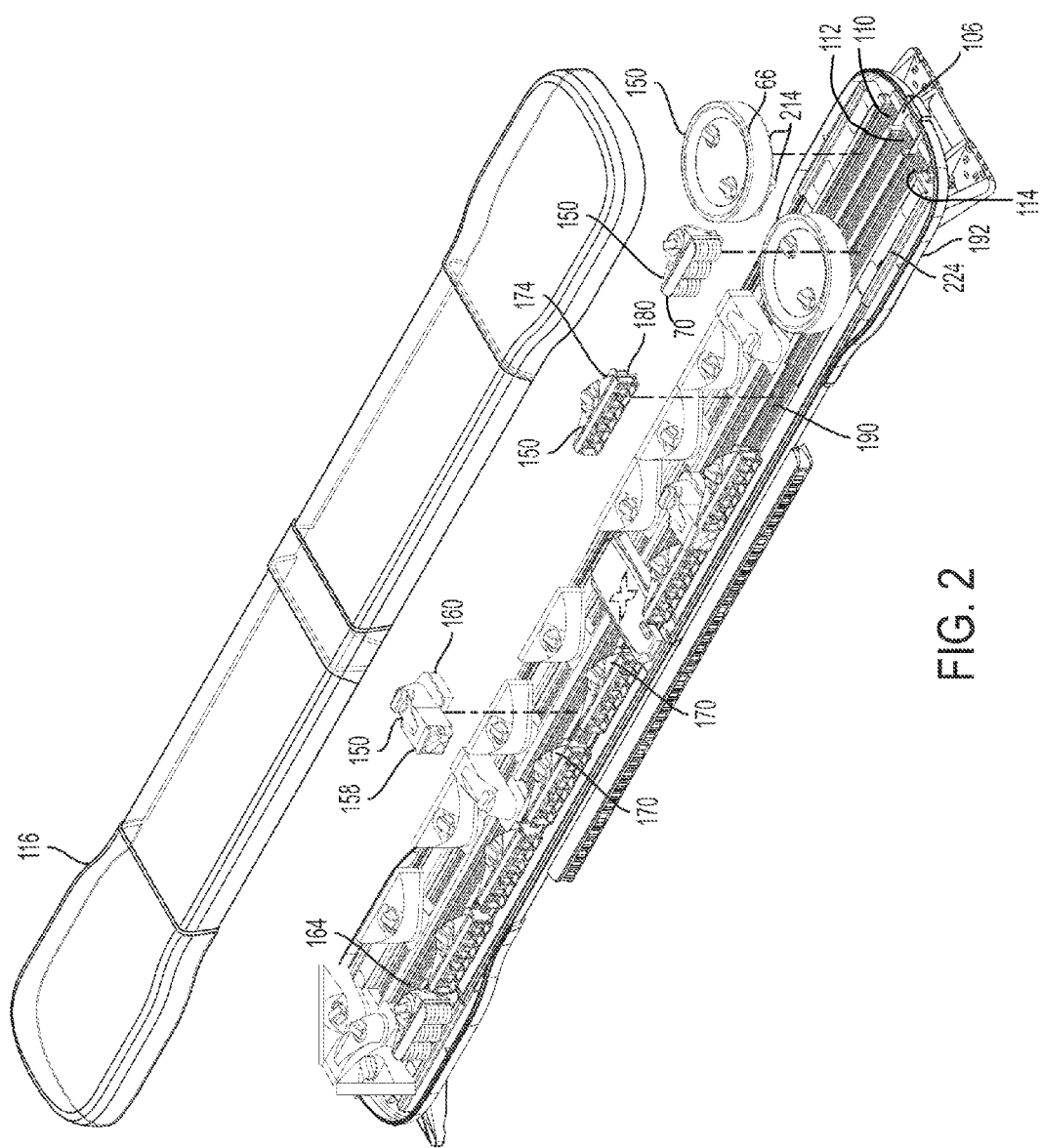
FIG. 2 is a partly exploded isometric top view of the vehicle-mountable track-lighting light bar of FIG. 1, showing a transparent and segmentable protective light cover that is decoupled from the light bar chassis, and a set of directional, task, beacon, and stop-tail-indicator (STI)—also called a stop-tail-turn (STT) in the U.S.—light modules released from their respective track mounting positions on the mounting platform.

FIG. 2 shows segmentable protective cover 116 (as assembled) lifted upward and away from light-module mounting platform 106 for positioning four light modules 150 at user-selected locations along light-module mounting platform 106. The locations shown depict one of countless arrangements. In the example shown here, a rear-facing, left-side task light module 158 includes a rectangular track-mounting foot 160 that is rotatably oriented and disposed above a left-side portion 164 of middle mounting track 112 for mounting rear-facing, left-side task light module 158 at a location between adjacent, rear-facing, left-side directional light modules 170. Similarly, a rear-facing, right-side directional light module 174 includes a rectangular track-mounting foot 180 (having an identical design to that of rectangular track-mounting foot 160) that is rotatably oriented and disposed above a right-side portion 190 of rear mounting track 114 for mounting rear-facing, right-side directional light module 174 at a location near a right-side end cap 192 of plastic U-shaped end caps 102. Also on the right side is beacon light module 66 that includes two track-mounting feet 214, of which at least one includes electrical circuitry for electrical association with a selected front or rear track, e.g., right-side portion 190 of rear mounting track 114. Finally, STI light module 70 is shown above right-side end cap 192 so as to engage a standard STI electrical receptacle 224 that has electrical connection members for conveying electrical power, taillight, and lighting signals in response to a vehicle stopping or indicating a turn.

Figure 3:
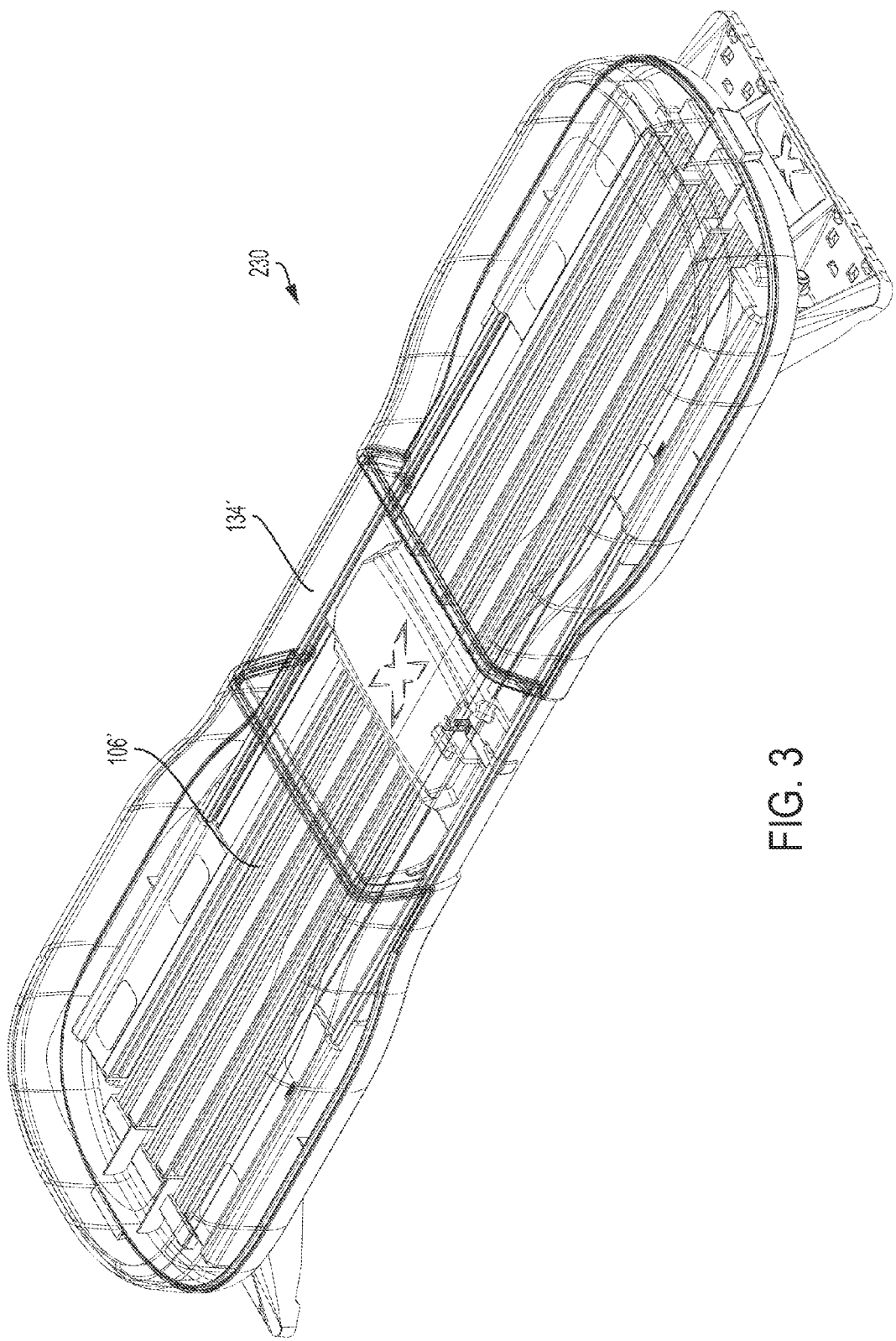
FIG. 3 is an isometric top view of a vehicle-mountable track-lighting light bar according to another embodiment having a shorter chassis length and fewer protective shell segments than those of the light bar of FIG. 1.
Figure 4:
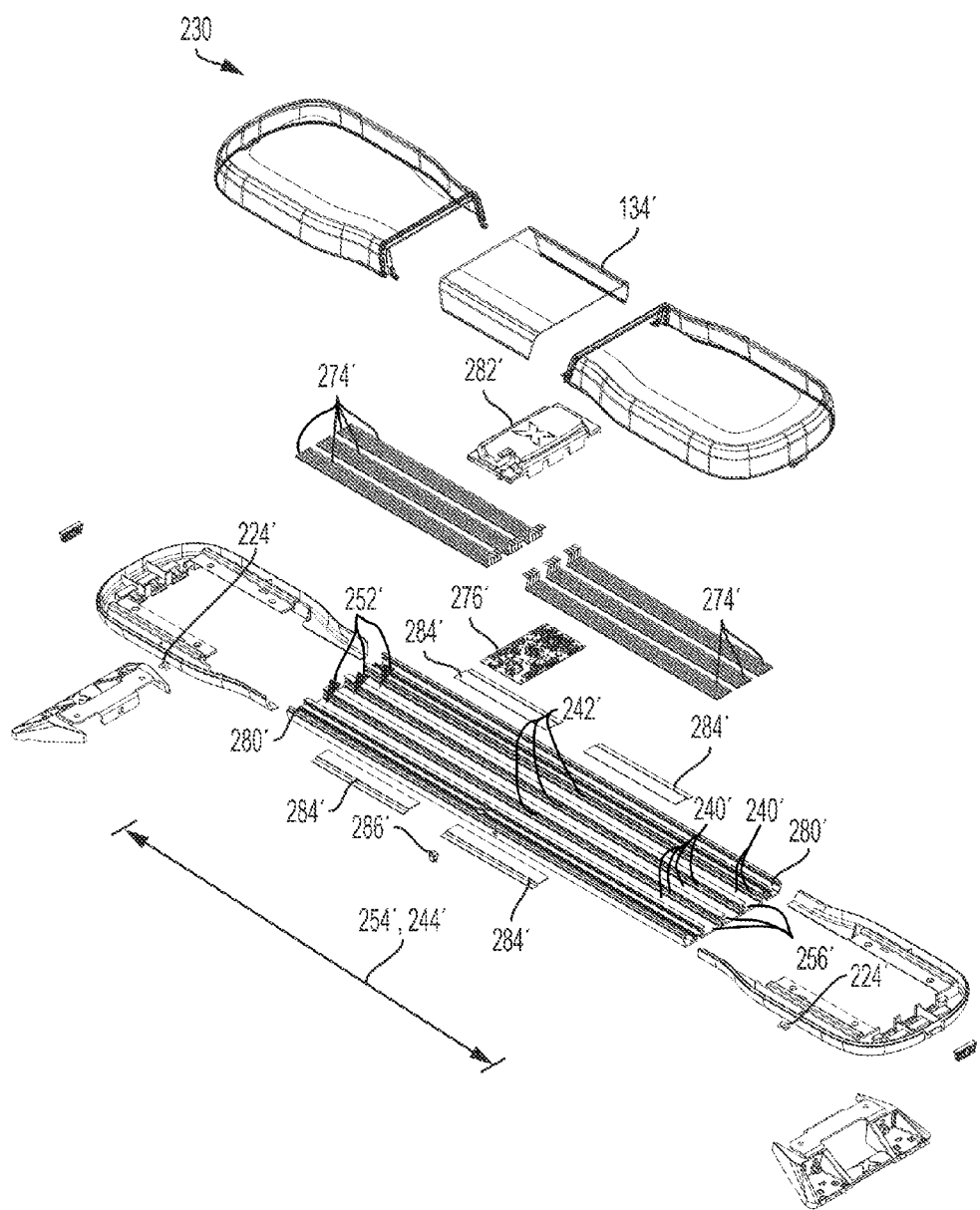
FIG. 4 is an exploded isometric top view of the light bar of FIG. 3.
Figure 5:
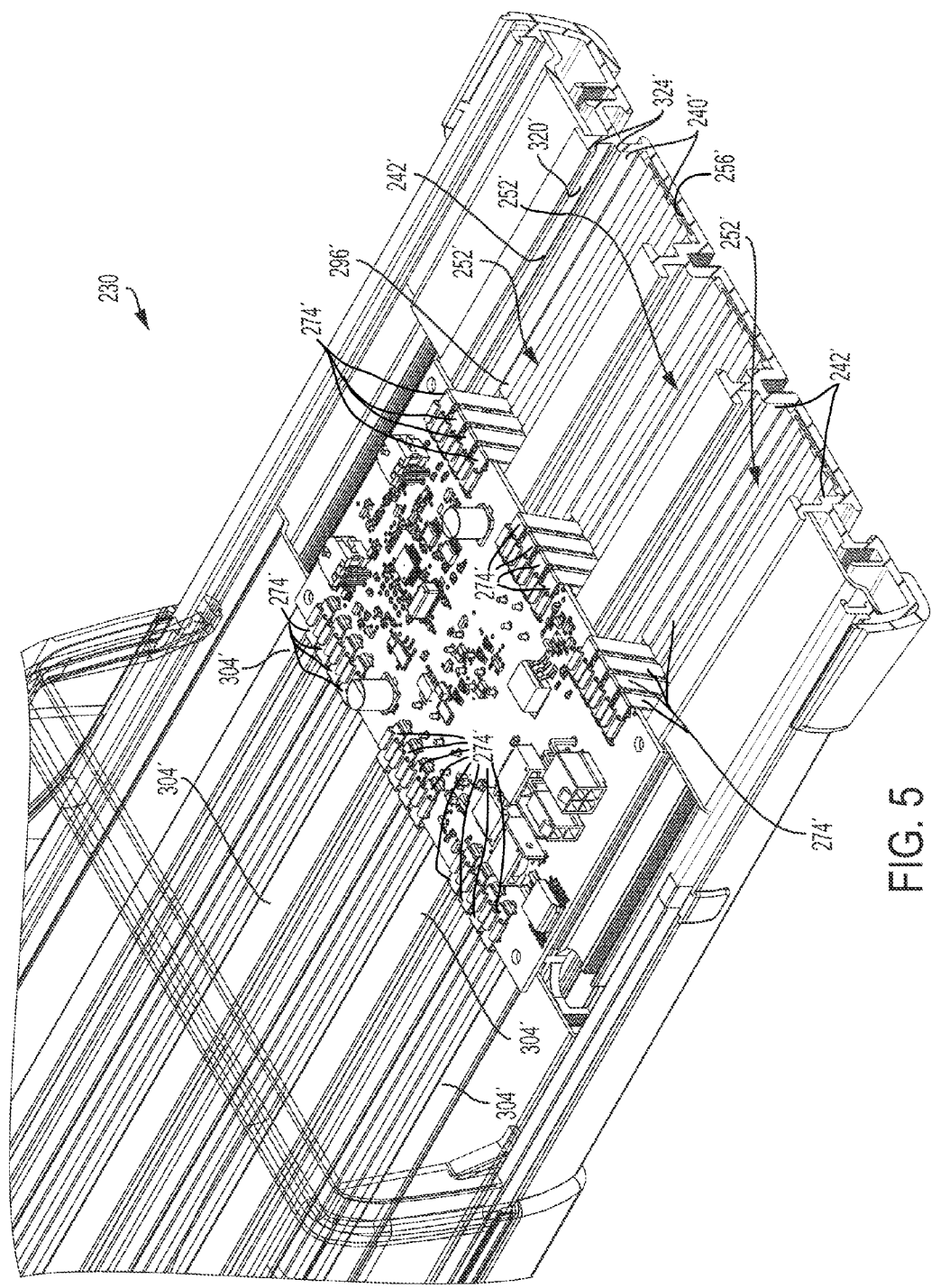
FIG. 5 is an enlarged fragmentary isometric top view of a central portion of the light bar of FIG. 3, shown with its controller housing cover and its central and right-side protective light cover segments removed so as to depict details of controller electrical circuitry and electrically conductive pathways running along left- and right-side mounting-track floor surfaces of front, rear, and middle mounting tracks.

FIGS. 3-5 show a shorter version of a vehicle-mountable track-lighting light bar 230 having many parts (i.e., components and features) that are the same as or similar to those of light bar 16. Because the two versions have identical or similar parts, identical reference numbers identify common parts, and reference numbers denoted with prime symbols specifically refer to corresponding parts shown in FIGS. 3-5. Unlike the version shown in FIGS. 1 and 2, however, vehicle-mountable track-lighting light bar 230 includes one central segment 134', has a shorter light-module mounting platform 106', and is shown without any mounted light modules so that details of its light-module mounting platform 106' are more clearly visible and not obscured by light modules.

FIG. 4 shows that light-module mounting platform 106' includes multiple laterally spaced-apart, rigid track walls 240' having side walls 242' and a side wall length 244', with different adjacent pairs of rigid track walls 240' defining light module mounting tracks 252'. Each of light module mounting tracks 252' has a track length 254' and a track floor 256' for supporting multiple laterally spaced-apart electrically conductive pathways 274' (i.e., rails) that carry electrical signals produced by a controller board assembly 276' (also called a driver board). Peripheral channels 280' stow wiring (e.g., for connecting standard STI electrical receptacles 224'). A controller cover 282' protects controller board assembly 276', and plastic covers 284' protect stowed wiring. A removable plug 286' plugs a wiring gap when safety director 44 (FIG. 1) is not installed.

FIG. 5 shows that electrically conductive pathways 274' are electrically isolated from light-module mounting platform 106' by insulating strips 296', which also isolate adjacent electrically conductive pathways 274' from each other. Accordingly, when a track-mounting foot 160 (FIG. 6) is set in one of light module mounting tracks 252', its leaf-spring electrical contact members 300 (FIG. 6) contact associated ones (i.e., three of four) of the electrically conductive pathways 274' such that track-mounting foot 160 maintains contact while it is slid lengthwise along track length 254' to a user-selected location. Controller board assembly 276', which is electrically associated with electrically conductive pathways 274', applies electrical signals for delivery to leaf-spring electrical contact members 300 and thereby activates a lighting component of the light module. Additional details of electrically conductive pathways 274 are described with reference to FIG. 14 in latter paragraphs of this disclosure.

Figure 6:
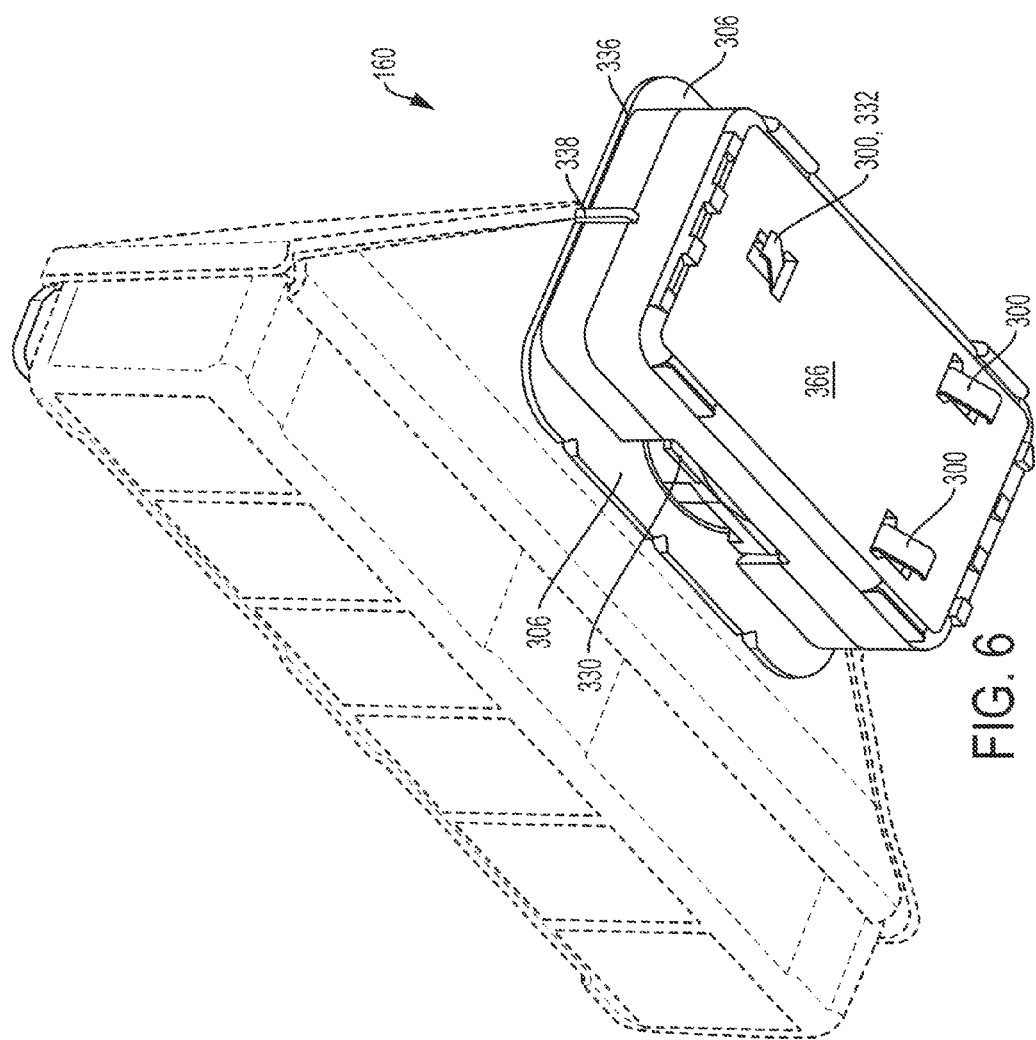
FIG. 6 is an isometric bottom view of a track-mounting foot of a light module of FIGS. 1 and 2, showing three leaf-spring electrical contacts extending from a bottom surface of the track-mounting foot for contacting electrically conductive pathways extending along a mounting-track floor surface of a mounting track.

FIGS. 5 and 6 also show structural features providing for releasable positioning of light modules. For example, FIG. 5 shows that bearing surfaces 304' atop track walls 240' extend in a plane parallel to floor 256'. Bearing surfaces 304' contact flanges 306 (FIG. 6) of track-mounting foot 160 for supporting a light module as it is slid in its associated light module mounting track 252'. Also, FIG. 5 shows slots 320', formed between spaced-apart ridges 324' in side walls 242' of confronting ones of track walls 240', run along length 244' of side walls 242'. Confronting slots 320' are spatially aligned and have substantially the same width and depth to receive laterally extending track-attachment members 330 (shown retracted in FIG. 6, extended in FIG. 9) of a light module having its track-mounting foot 160 set in light module mounting track 252'.

A middle leaf-spring electrical contact member 332 (FIG. 6) is slightly off center so as to engage one of two middle electrically conductive pathways 274' (depending on the rotational position of track-mounting foot 160). And because track-mounting foot 160 is rotatable by 180 degrees (e.g., for use in front or back mounting tracks), a small circuit board 334 (FIG. 7) within a track-mounting foot housing 336 includes whetstone bridge electrical circuitry for reversing polarity of power and ground carried on a pair of outer electrically conductive pathways.

By rotating track-mounting foot housing 336, middle leaf-spring electrical contact member 332 is capable of selectively contacting one of the two middle electrically conductive pathways 274' and thereby receiving a selected electrical signal according to the rotational position. For example, a first contact position is used to engage a power electrically conductive pathway providing an uninterrupted source of power, a ground electrically conductive pathway, and a first signal electrically conductive pathway; whereas a second contact position is used to engage ground electrically conductive pathway, power electrically conductive pathway, and a second signal electrically conductive pathway. Thus, the first signal electrically conductive pathway may carry a first sequence of lighting control signals activating a first group of light modules (e.g., light modules producing light that is red in color), whereas the second signal electrically conductive pathway may carry a second sequence of lighting control signals activating a second group of light modules (e.g., light modules producing light that is blue in color) that are different from the first group of light modules. This design approach avoids the use of numerous signal wires routed to each light module, and provides for rapid reconfiguration without the use of tools. A small exterior tab 338 indicates for a user the side of track-mounting foot 160 that is closest to middle leaf-spring electrical contact member 332 so that a user can readily determine its rotational position even after track-mounting foot 160 is installed in a track.

It should be understood that other techniques for repositioning middle leaf-spring electrical contact member 332 are possible and within the scope of this disclosure. For example, a middle leaf-spring electrical contact member may be independently moveable by sliding or (re-)plugging it into various contact positions. In other words, other means of (lateral) displacement of a contact member, relative to its associated contact members, are possible. In another embodiment, contact members may be selectively (de)activated using, for example, switching devices, in which case a subset of active contact members would carry electrical signals of selected rails.

FIGS. 7 and 8 show a planetary gear system 340 that provides for rotatable adjustment of track-mounting feet, and for arresting rotation upon deployment of laterally extending track-attachment members 330 into slots 320 (FIG. 5). Planetary gear system 340 includes a driveshaft brace 344 that confronts and stabilizes a driveshaft 346. Driveshaft 346 receives at its drive end 348 a user-graspable twist knob 350 and at its driven end 352 has a sun gear 356. Sun gear 356 is braced by a gear brace 358 that maintains contact between the teeth of sun gear 356 and those of an orbital, annular gear 360. Annular gear 360 has on its circumferential side wall a pair of laterally extending track-attachment members 330 that extend and retract as driveshaft 346 is rotated about its longitudinal axis of rotation normal to a bottom surface 366 (FIGS. 6 and 7) of track-mounting foot 160. A cover plate 364, having a central aperture, receives annular gear 360.

Figure 9:
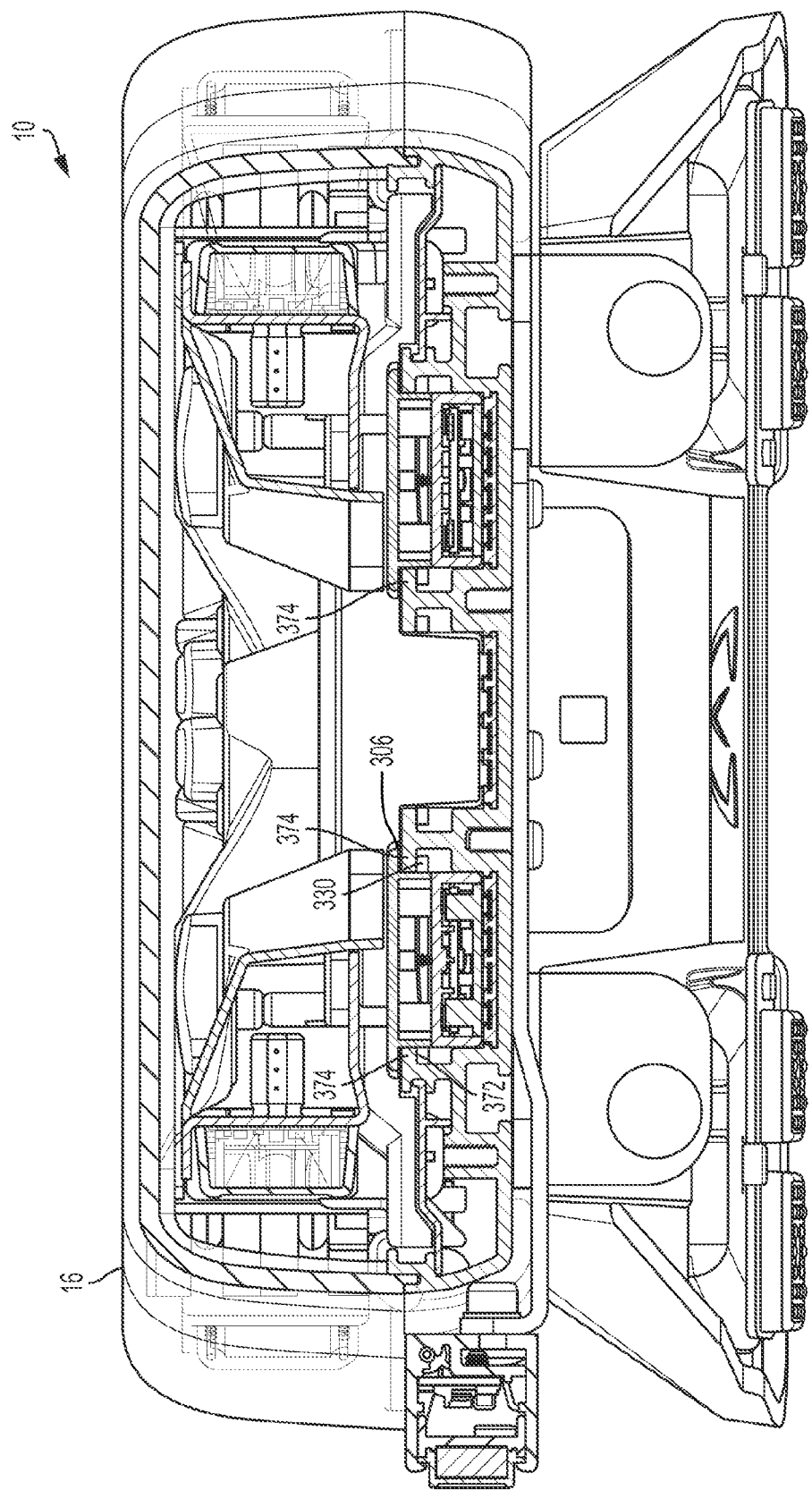
FIG. 9 is a section view taken along line 9-9 of FIG. 1, showing a front-facing directional light module set in a front mounting track according to a first electrical contact position, and a rear-facing directional light module set in a rear mounting track according to a second electrical contact position in which the track-mounting foot of the rear-facing directional light module is rotated 180 degrees about an axis of a driveshaft of the planetary gear assembly.

FIGS. 7-9 show how ramped surfaces 370 (FIG. 7) of laterally extending track-attachment members 330 engage slots 320' (FIG. 5) to releasably secure track-mounting feet 160 within an associated track. Specifically, laterally extending track-attachment members 330 act as a cam rotatable about the longitudinal axis defined by user-twistable driveshaft 346 so that cam lobes (i.e., ramped surfaces 370) slide against an upper interior slot surface 372 (FIG. 9) and cause the lobes to take up increasing amounts of width of slots 320. As the lobes take up space, upper ridges 374 of slots 320 are pinched between flanges 306 and track-attachment members 330. Concurrently, ramped surfaces 370 force detents 376 (FIG. 7) that are located on a bottom face of gear brace 358 into corresponding grooves 378 (FIG. 8) that are mutually angularly spaced apart in 15-degree increments about a circumference of a circular wiring aperture in track-mounting foot housing 336. When they are forced into corresponding grooves 378 by the pinching of upper ridges 374, detents 376 prevent further rotation between a light housing 380 and track-mounting foot 160 because detents 376 of gear brace 358 are fastened to light housing 380, and grooves 378 are affixed to track-mounting foot 160. When detents 376 are free from (i.e., do not engage) grooves 378, however, directional optic 382 is readily rotatable about the longitudinal axis of drive shaft 346 to provide illumination in selectable directions.

FIGS. 7 and 8 also show a circuit board 390 of directional light module 56 that drives multiple light emitting diode (LED) 392 lighting components in response to a pulse width modulated (PWM) lighting control signal receiving from a signal rail. PWM lighting control signals are used for rapidly power cycling LEDs 392 so as to adjust brightness and mitigate heat buildup from LEDs 392. For example, when a light bar is configured for providing steady illumination (i.e., no flashing), a rapid 50% duty cycle (or less) may be used to appear as flicker-free illumination. This rapid power cycling reduces heat buildup within the internal compartment of the light bar 16 and decreases brightness. Other duty cycles may be used to further reduce brightness. A low brightness, nighttime operational mode is established at a duty cycle of about 40%, according to some embodiments.

Figure 10:
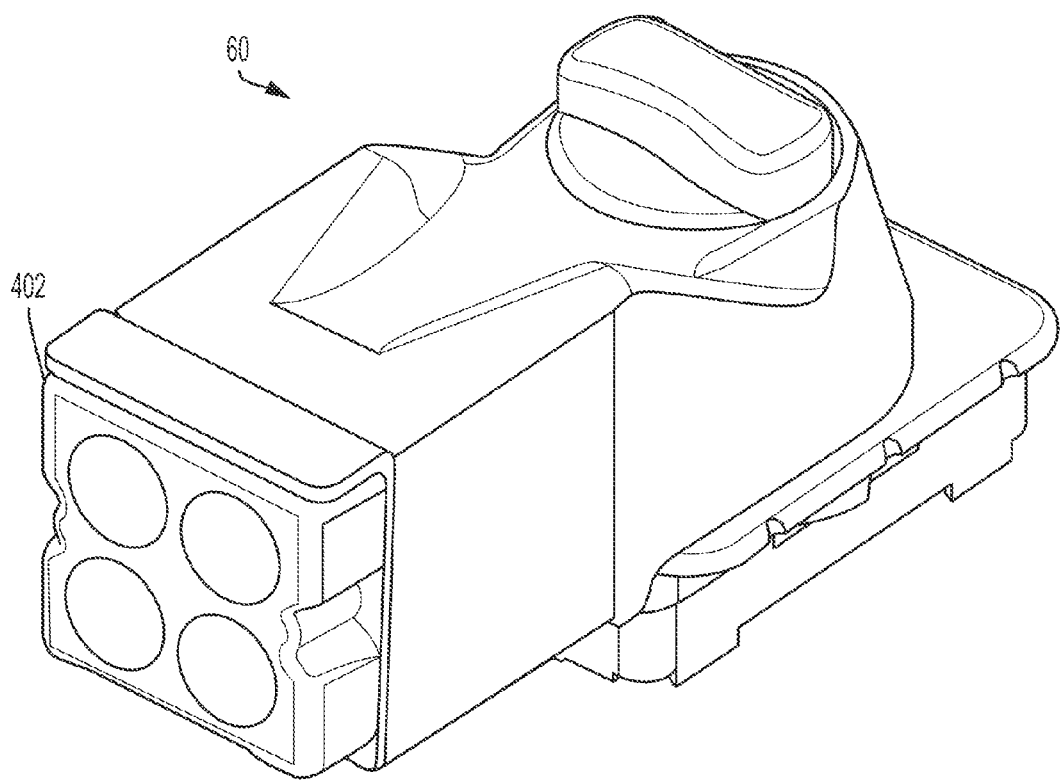
FIG. 10 is an isometric top view of a task light mountable within a middle mounting track in front-, side-, or rear-facing positions to provide, respectively, takedown, alley (side street), or worklight illumination.

FIG. 10 shows a task light module 60 that is similar to directional light module 56 in that it receives power, ground, and signals as described previously. Its associated signal rail may be automatically controlled as part of a flashing pattern produced by controller board assembly 276, or manually controlled as work light, alley, or takedown illumination as desired. Illumination produced by task light module 60 is highly focused due to a substantially square optic 402, which is capable of producing a highly focused beam of light toward a user-selected direction.

Figure 11:
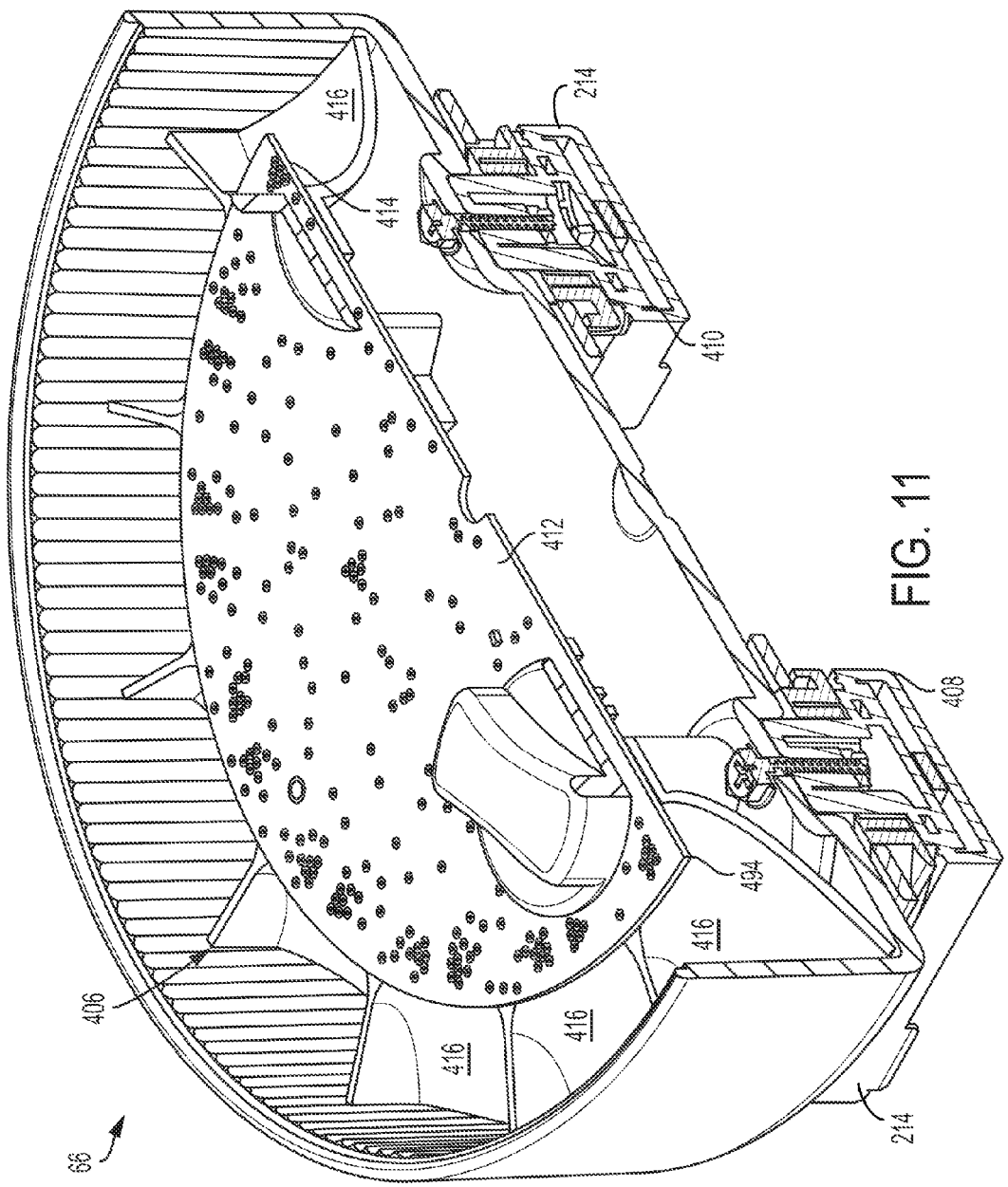
FIG. 11 is an isometric cross-sectional view of a light beacon with its top panel removed to show an annular parabolic reflector array, the light beacon having two track-mounting feet for placement in respective front- and rear-side mounting tracks.

FIG. 11 shows a section of beacon light module 66 with its top panel removed so as to illustrate an annular parabolic reflector array 406, while also showing additional details of its two track-mounting feet 214 that straddle middle mounting track 112 (FIG. 1). Accordingly, a first track-mounting foot 408 provides for support and stability, whereas a second track-mounting foot 410 receives signals from an associated signal rail (e.g., as described previously with respect to FIG. 6), and provides the lighting control signals to an electronic rotation controller board 412. Electronic rotation controller board 412 controls electronic rotation or flashing activation of multiple LEDs 414 that are mutually circumferentially spaced apart from one another and face a parabolic reflector 416 of annular parabolic reflector array 406. Thus, second track-mounting foot 410 receives power, ground, and lighting control signals that configure beacon light module 66 to operate in one of two modes: rotating or flashing.

When in rotating mode, beacon light module 66 sequentially activates each one of multiple LEDs 414 in a circular fashion to generate standard electronic rotation flash patterns, such as, for example, flash patterns complying with the Economic Commission for Europe (ECE) Regulation 65 (R65). A low-voltage synchronization signal is modulated on a signal rail to periodically reset the angular position of the electronic rotation sequence to its initial positions (e.g., zero or 180 degrees, as determined by the contact position of a middle leaf-spring). For example, when second track-mounting foot 410 is placed within front mounting track 110, the low-voltage synchronization signal resets the angular position of the electronic rotation sequence to zero degrees, but when second track-mounting foot 410 is placed within rear mounting track 114, the low-voltage synchronization signal resets the angular position of the electronic rotation sequence to 180 degrees. The low-voltage synchronization signal thereby maintains rotational synchronization between two different beacons that may have slightly different internal timing drift, may be associated with different signal rails, and are perhaps spaced apart on opposite sides of a light bar.

When in flashing mode, beacon light module 66 flashes in synchronism with other light modules associated with a common signal rail. Beacon light module 66, however, is larger and capable of dissipating heat, in which case it may optionally ignore PWM signals (e.g., when a light bar is in nighttime operational mode).

Changing beacon light module 66 from rotating mode to flashing mode is achieved by use of a low-voltage signal or data byte provided to circuitry of electronic rotation controller board 412. The signal or data byte and the aforementioned low-voltage synchronization signal are not detected by other light modules associated with a common signal rail because these low-voltage signals are not detectable by circuitry of circuit boards 334 (FIG. 7). Thus, directional light modules, for example, may continue producing illumination in response to electrical signals irrespective of whether those signals include data communicated via the associated signal rail.

Figure 12:
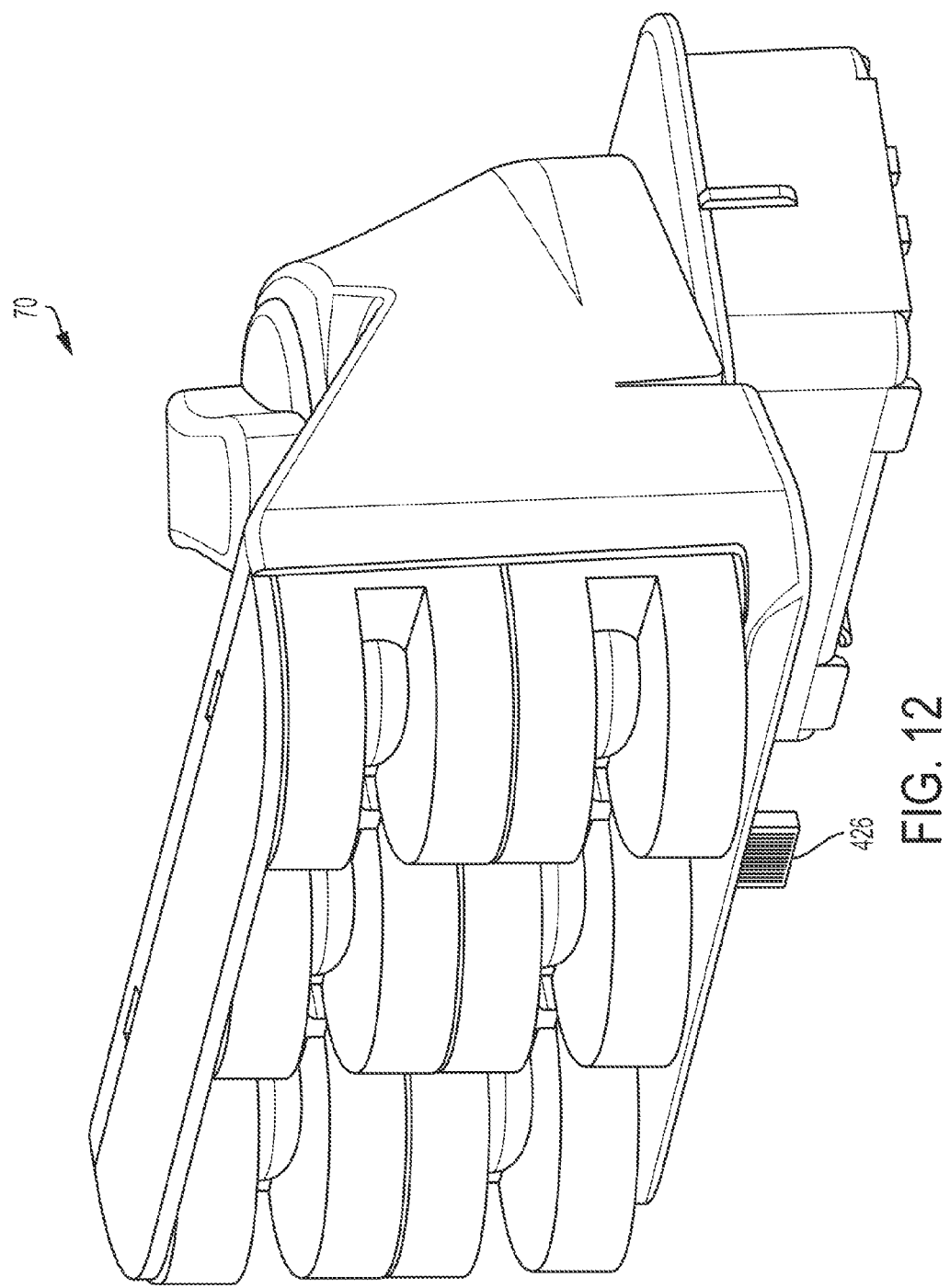
FIG. 12 is an isometric frontal view of an STI light module.

FIG. 12 shows an STI light module 70 including a connector 426 that plugs into receptacle 224' (FIG. 4). FIG. 13 shows a cross-section of a middle-track light module 76. Module 76 is similar to a vehicle's interior dome light in that it has a translucent cover 430 to disperse in multiple directions light emitted by forward-facing LEDs 434.

Figure 14:
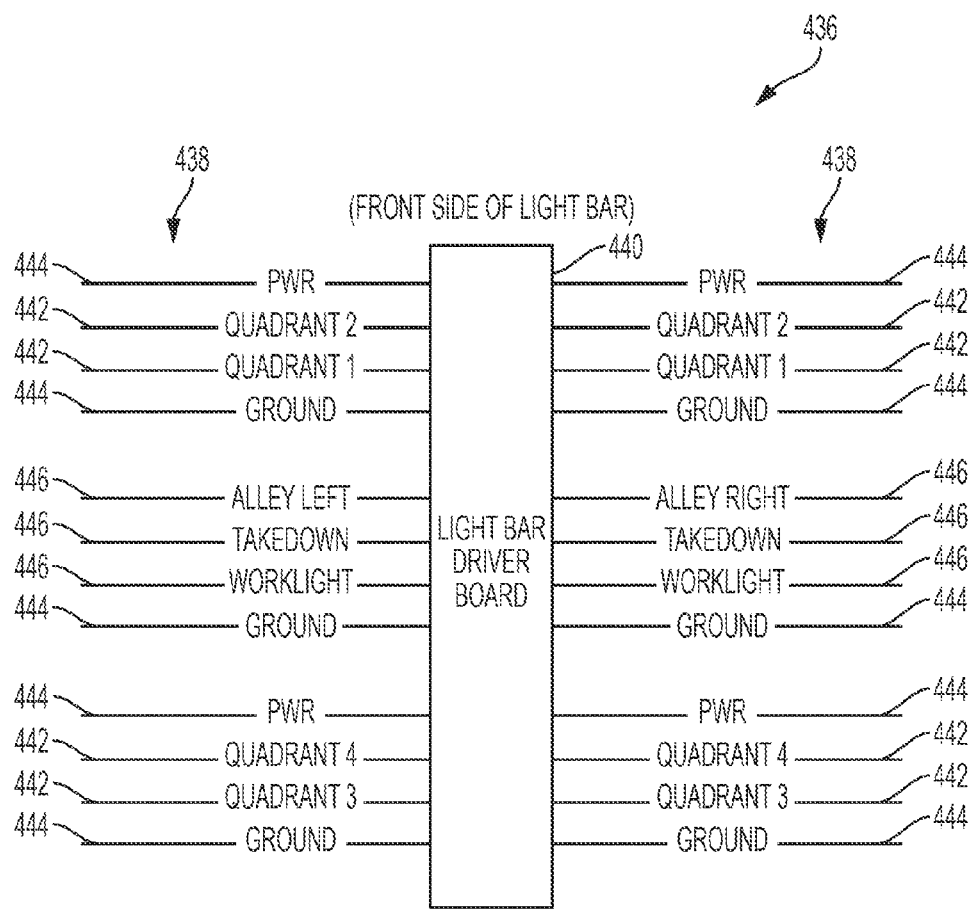
FIG. 14 is a block diagram showing details of electrically conductive pathways.

FIG. 14 is a simplified block diagram 436 showing details of 24 electrically conductive pathways 438 that correspond to those of FIG. 5 (i.e., electrically conductive pathways 274'). Light bar driver board (block) 440 represents electrical circuitry of controller board assembly 276' (FIG. 4) used to apply electrical signals to electrically conductive pathways 438. Lines marked "QUADRANT" represent signal rails 442, which provide a 9-32 volt positive signal applied to a middle leaf-spring electrical contact so as to activate a light module connected to that corresponding signal rail. Illumination dimming is achieved by pulse-width modulation of a signal applied to the signal rail. Lines marked "PWR" and "GROUND" provide power and ground rails 444 to associated directional light modules 56 in light bar 16. Lines marked "ALLEY," "TAKEDOWN," and "WORKLIGHT" also represent power rails 446, which provide 9-32 volt, direct current to whichever power rails 446 are activated. According to some embodiments, no dimming (pulse-width modulation) is used on power rails 446.

Light bar 16 and safety director 44 have multiple, predefined flash patterns, each of which defines a sequence of pulses applied to a combination of signal rails 442 (and through a wire connected to safety director 44). For example, a flash pattern may repetitively activate a cycle of signals including a first series of short pulses on QUADRANTS 2 and 3, a second series of short pulses on QUADRANTS 1 and 4, and a long pulse on all QUADRANTS.

Sets of flash patterns reside in light bar driver board 440. This allows for one common storage location of flash patterns, such that a user controller (e.g., keypad 30, FIG. 1) may be readily replaced while retaining the set of flash patterns. Thus, at power-up, light bar driver board 440 uploads its set of flash patterns to keypad 30 and safety director 44 (if they are attached).

Turning back to FIG. 1, junction box 20 has power and CAN connection points for light bar 16. In some embodiments, junction box 20 has a 4-pin Micro-Fit 3.0™ connector—available from Molex Incorporated of Lisle, Ill.—for connection of keypad 30, and it has input and output connectors for an auxiliary output used to activate a relay for switching optional auxiliary equipment, a park-lights input (e.g., for conveying a vehicle parking lights signal to light bar 16), additional STI inputs (left, right, and stop), and discrete wire control inputs from switches that a user may switch to control light bar 16 in lieu of using a keypad. When keypad 30 is connected, however, its commands have priority over controls provided over such discrete wires.

Keypad 30 connects to junction box 20 via cable 34. Two wires of cable 34 provide power and ground from junction box 20. Additional wires of cable 34 provide a CAN interface for data transfers in connection with user manipulation of a user interface in the form of eleven backlit pushbuttons 450 and twelve LED indicators 456. Functionality of the user interface for controlling selection of the flash patterns of light bar 16 and safety director 44 is described as follows.

A preset flash pattern selection button 464 is used to resume activation of a previous flash-pattern state, cycle through three preset flash patterns of light bar 16 (preselected from among 29 possible preset flash patterns explained in subsequent paragraphs), deactivate light bar 16 light modules without storing the current flash-pattern state of light bar 16, or deactivate light modules of light bar 16 while storing the current flash-pattern state of light bar 16. Specifically, pressing button 464 four times cycles light bar 16 through the following sequence: resuming activation of a previously stored flash-pattern state, such as a first preset flash pattern; activation of a second preset flash pattern; activation of a third flash pattern that also deactivates electronic rotation (if active); and deactivation of light modules 50 by switching off power to light bar 16. Holding button 464 down for at least two seconds deactivates (switches off) light bar 16, including all of its light modules (directional light modules, worklights, safety director, and auxiliary output), while simultaneously storing its current flash-pattern state.

Two adjacent indicator LEDs 468 indicate which one of the three selected preset flash patterns is currently selected according to illumination of left, right, both, or none of indicator LEDs 468. Indicator LEDs 468 emit light according to two illumination intensity levels: a first brighter one for a daytime operational mode, and a second dimmer one for a nighttime operational mode. These modes are selectable using an illumination control button 470. Likewise, button 464 is illuminated. It is backlit in response to keypad 30 either receiving the park-lights input signal indicating that the vehicle parking lights or headlights are on, or a user activating a nighttime operational mode by selecting illumination control button 470.

Pressing button 470 activates a nighttime operational mode of light bar 16. In this mode, if light modules 50 are actively flashing (or are activated while light bar 16 is in the nighttime operational mode), the flashing will incorporate a reduced PWM duty cycle so as to dim directional light modules 56. According to one embodiment, a duty cycle of about 40% is used during nighttime operational mode (where 100% represents no pulse-width modulation). Pressing button 470 a second time switches off the nighttime operational mode and establishes the regular brightness, daytime operational mode. As noted, button 470 also controls the backlighting for other buttons.

A flash pattern selector button 480 advances light bar 16 to the next available flash pattern, provided light bar 16 is actively flashing according to one of its three preset flash patterns. According to one embodiment, there are 29 available flash patterns, any of which can be assigned to any of the three presets. For example, successively pressing button 480 cycles through the 29 available flash patterns, and when a user stops pressing button 480, the currently selected pattern is stored as the preset that is presently active (as indicated by indicator LEDs 468). If button 480 is held down for more than a second, then the flash pattern moves to a previous pattern in the series of 29, instead of advancing by one pattern. There is also a timeout feature, whereby after one minute of operation, button 480 becomes inactive. This feature, in addition to the recessed lower profile of button 480, reduces the likelihood of inadvertent flash pattern changes caused by mistakenly pressing button 480. If the button timeout has occurred, then a double-press of button 480 will reactivate its selector functionality.

Corner LEDs 486 indicate to an observer of the user interface how light modules of light bar 16 are flashing. A left front LED flashes in response to a QUADRANT 1 signal. A right front LED flashes in response to a QUADRANT 2 signal. A left rear LED flashes in response to a QUADRANT 3 signal. And a right rear LED flashes in response to a QUADRANT 4 signal. Thus, each of corner LEDs 486 flashes whenever a corresponding directional light module in light bar 16 is actively producing illumination. Also, corner LEDs 486 are active and do not flash when a so-called steady-on lighting pattern is selected, which is typically used when beacon light modules 66 are in a rotational mode. Corner LEDs 486 are active for several seconds after a new pattern is selected, but then they switch off so as to not distract a person inside the vehicle. Similar to indicator LEDs 468, the intensity of the illumination produced by corner LEDs 486 is brighter for daytime operational mode, and dimmer for nighttime operational mode.

A cruise mode button 490, when pressed, activates all of the flashing directional modules and beacon light modules 66 in the light bar 16 in steady-on mode at a duty cycle of about 30%, but other duty cycles are possible. Pressing button 490 a second time switches off cruise mode.

Task light buttons 494, when pressed, switch on or off corresponding alley, worklight, or takedown light modules. Specifically, left and right task light buttons 494 control, respectively, ALLEY LEFT and ALLEY RIGHT signal rails. Worklight and takedown task light buttons 494 control, respectively, WORKLIGHT and TAKEDOWN signal rails.

Task light buttons 494 also are used to configure light bar 16. For example, according to one embodiment, the mode of beacon light modules 66 switches between rotating mode and flashing mode in response to a user simultaneously pressing and holding left and right (alley light) task light buttons for two seconds. In response, corner LEDs 486 flash for two cycles according to a pattern indicating the currently selected mode. For rotating mode, corner LEDs 486 each flash in a clockwise sequence to signal electronic rotation. For flash mode, corner LEDs 486 all flash simultaneously. Thus, corner LEDs 486 indicate whether the rotational mode of beacon light modules 66 has been changed between rotate and flash modes. In another embodiment, simultaneously pressing and holding work and takedown light buttons for two seconds changes an available set of lighting flash patterns from a first set of R65 compliant patterns to a second set of patterns that may include pre-defined patterns that are not R65 compliant. This allows light bar 16 to enable and disable strict R65 compliance, without necessitating a firmware change to do so.

Auxiliary button 496 switches on or off the auxiliary output of junction box 20. It is meant to control an external relay, which in turn will control an auxiliary light or other unit, such as a loudspeaker, horn, or other electronic device.

Six indicator LEDs 500 indicate the flash pattern of safety director 44. Pressing a left button 502 switches safety director 44 on or off. Pressing a right button 504 advances to a subsequent safety director flash pattern. If button 504 is pressed for more than one second, the selected flash pattern returns to the previous pattern available. Safety director 44 also has a preset flash pattern, such that when safety director 44 is powered on, it resumes flashing according to its previously selected preset flash pattern.

Skilled persons will understand that many changes may be made to the details of the above-described embodiments without departing from the underlying principles of the invention. The scope of the present invention should, therefore, be determined only by the following claims.

The invention claimed is:

1. A vehicle-mountable track-lighting light bar for supporting multiple light modules in user-configurable mounting positions, each of the multiple light modules having a mounting foot, electrical contacts, and laterally extending track-attachment members, the vehicle-mountable track-lighting light bar comprising:
   a light-module mounting platform including multiple laterally spaced-apart, rigid track walls, different adjacent pairs of the track walls defining light module mounting tracks, each of the light module mounting tracks having a track length and a floor;
   each of the track walls having a side wall that has a length and in which a slot, formed between spaced-apart ridges, runs along the length of the side wall, the slot having a width and a depth;
   the slots formed in the side walls of confronting ones of the track walls being spatially aligned and having substantially the same width and depth to:
      receive the laterally extending track-attachment members of a light module having its mounting foot set in the light module mounting track with which the slots are associated, and
      facilitate sliding motion of the light module along the track length of the light module mounting track to a user-selected location;
   multiple laterally spaced-apart electrically conductive pathways supported on the floor of each of the light module mounting tracks, adjacent ones of the electrically conductive pathways being electrically isolated from each other, such that the light module, when its mounting foot is set in the light module mounting track, is slidable lengthwise along the track length while its electrical contacts are contacting associated ones of the electrically conductive pathways; and
   a controller electrically associated with the electrically conductive pathways to apply electrical signals for delivery to the electrical contacts of the light module.

2. The vehicle-mountable track-lighting light bar of claim 1, in which the electrically conductive pathways of one of the light module mounting tracks include:
   two outer electrically conductive pathways for providing respective electrical power and ground connections; and
   multiple inner electrically conductive pathways, each of which is dedicated to provide an electrical signal that activates a corresponding light module having an electrical contact positioned to contact the inner electrically conductive pathway to receive the electrical signal.

3. The vehicle-mountable track-lighting light bar of claim 1, in which the electrically conductive pathways of one of the light module mounting tracks include a first electrically conductive signal pathway and a second electrically conductive signal pathway, and in which the controller is configured to:
   receive, from a user interface located within a vehicle interior compartment, digital commands representing lighting patterns; and
   produce, based on a lighting pattern selected by a user using the user interface, a first lighting signal for application to the first electrically conductive signal pathway and a second lighting signal, temporally displaced from the first lighting signal, for application to the second electrically conductive signal pathway that is spaced apart from the first signal pathway.

4. The vehicle-mountable track-lighting light bar of claim 1, in which the electrical contacts comprise leaf-spring electrical contacts extending from a bottom surface of the mounting foot.

5. The vehicle-mountable track-lighting light bar of claim 1, in which the electrically conductive pathways of one of the light module mounting tracks include an electrically conductive signal pathway, and in which the controller is configured to provide a timing signal for application to the electrically conductive signal pathway at a voltage level that is detectable by circuitry of a first light module having an electrical contact contacting the electrically conductive signal pathway and that is undetectable by circuitry of a second light module having an electrical contact contacting the electrically conductive signal pathway.

6. The vehicle-mountable track-lighting light bar of claim 1, in which the electrically conductive pathways of one of the light module mounting tracks include:
   a first electrically conductive pathway for providing an electrical power connection;
   a second electrically conductive pathway for providing an electrical ground connection;
   a third electrically conductive pathway for providing a first electrical signal to activate a first set of light modules that each have an electrical contact contacting the third electrically conductive pathway; and
   a fourth electrically conductive pathway for providing a second electrical signal to activate a second set of light modules that each have an electrical contact contacting the fourth electrically conductive pathway.

7. The vehicle-mountable track-lighting light bar of claim 1, in which each of the multiple rigid track walls comprises a bearing surface extending in a plane parallel to the floor and configured to contact a flange of the mounting foot for supporting the light module as it slides in its associated light module mounting track.

8. The vehicle-mountable track-lighting light bar of claim 1, in which at least one of the light module mounting tracks includes a stop-tail-indicator light connector receptacle.

9. The vehicle-mountable track-lighting light bar of claim 1, further comprising:
   a first electrically conductive signal pathway operable to provide a first lighting signal to a first group of electrical contacts of first light modules, the first group of electrical contacts set in a first contact position arrangement so as to activate lighting components of the first light modules in response to the first lighting signal; and
   a second electrically conductive signal pathway operable to provide a second lighting signal to a second group of electrical contacts of second light modules, the second group of electrical contacts set in a second contact position arrangement so as to activate lighting components of the second light modules in response to the second lighting signal and independently of the activation of the first lighting components.

10. A vehicle track-lighting system, comprising:
the vehicle-mountable track-lighting light bar of claim 1; and
a sound-producing module mounted to the light bar and configured to receive sound emission activation signals from the controller.

11. The vehicle track-lighting system of claim 10, in which the light module is selected from the group consisting of a directional light module having a substantially rectangular-shaped front surface formed from an array of optic elements, a modular light beacon having a light reflecting array, an omni-directional light module, a stop-tail-indicator light module, a safety director, and a task light module having an optic including a substantially square-shaped front surface.

12. A vehicle track-lighting system, comprising:
the vehicle-mountable track-lighting light bar of claim 1; and
a light module.

13. A light module for placement in a vehicle-mountable track-lighting light bar having a light-module mounting platform including multiple light module mounting tracks for supporting multiple light modules in user-configurable mounting positions, each of the multiple light module mounting tracks including multiple laterally spaced-apart electrically conductive pathways, the light module comprising:
a lighting component; and
a mounting foot having a set of electrical contacts in which a member of the set is moveable relative to the lighting component to provide a user-selectable contact position from among multiple available contact positions for contacting different groups of electrically conductive pathways running along one of the multiple light module mounting tracks, the multiple available contact positions including:
a first contact position defined by the member of the set of electrical contacts positioned for contacting a first electrically conductive signal pathway of the electrically conductive pathways and receiving a first lighting signal applied to the first electrically conductive signal pathway, and
a second contact position defined by the member of the set of electrical contacts positioned for contacting a second electrically conductive signal pathway of the electrically conductive pathways, such that the member of the set of electrical contacts is spaced apart from the first electrically conductive signal pathway and thereby receives the second lighting signal to activate the lighting component independently of activation of other lighting components operatively associated with the first lighting signal applied to the first electrically conductive signal pathway.

14. The light module of claim 13, further comprising a track-attachment member configured to apply force to releasably secure the mounting foot to the light module mounting track when the mounting foot is deployed in the user-selectable mounting position.

15. The light module of claim 14, in which the rigid track walls include side walls and a slot along a side wall, and in which the track-attachment member comprises a planetary gear assembly having an annular gear mechanically coupled to a sun gear formed along a user-twistable driveshaft, the annular gear having an outer circumferential surface including a cam rotatable about an axis defined by the user-twistable driveshaft so that lobes of the cam releasably engage the slots along the side walls of the rigid track walls.

16. The light module of claim 13, in which the user-selectable contact position is established by rotation of the mounting foot about an axis normal to a bottom surface of the mounting foot.

17. The light module of claim 13, in which the set of electrical contact members includes a first outer member, a second outer member, and a third member at a location on the mounting foot between the first outer member and the second outer member, and in which the user-selectable contact position is established by lateral displacement of the third member relative to the first outer member and the second outer member.

18. The light module of claim 13, in which the electrically conductive pathways further comprise a first power supply pathway and a second power supply pathway, the first power supply pathway having a positive electrical polarity with respect to that of the second power supply pathway, and in which the light module includes electrical circuitry to reverse electrical polarity between the first power supply pathway and the second power supply pathway when the mounting foot is placed in the second contact position.

19. The light module of claim 13, further comprising circuitry to receive a digital command signal applied to one of the electrically conductive pathways at a voltage level undetectable by another light module having electrical contacts contacting the one of the electrically conductive pathways.

20. The light module of claim 13, in which the rigid track walls include side walls and a slot along a side wall, the light module further comprising:
a light housing;
a detent rotatable in response to user rotational adjustment applied to the light housing;
an annular set of recesses in a surface of the mounting foot at locations to confront and receive the detent so as to arrest the user rotational adjustment; and
a planetary gear assembly having an annular gear mechanically coupled to a sun gear rotatable by a user twisting a driveshaft, the annular gear having an outer circumferential surface including a cam rotatable about an axis defined by the driveshaft such that a lobe of the cam releasably engages an associated slot, the lobe including a ramped surface that, in response to the user twisting the driveshaft, slides against a slot surface of the associated slot while the ramped surface causes the lobe to take up increasing amounts of width of the associated slot so as to force the electrical contacts toward and into engagement with the electrically conductive pathways and bring the detent into a member of the annular set of recesses so as to lock the rotational adjustment applied to the light housing and to releasably lock the light module in position along one of the multiple light module mounting tracks.

* * * * *